United States Patent
Paul et al.

(10) Patent No.: US 9,404,735 B2
(45) Date of Patent: Aug. 2, 2016

(54) MULTIPLE LASER TIME OF ARRIVAL PROBE

(71) Applicant: UNITED TECHNOLOGIES CORPORATION, Farmington, CT (US)

(72) Inventors: John E Paul, Portland, CT (US); Robert Kujawa, Stuart, FL (US); Darren M. Wind, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 273 days.

(21) Appl. No.: 14/134,452

(22) Filed: Dec. 19, 2013

(65) Prior Publication Data

US 2014/0268100 A1    Sep. 18, 2014

Related U.S. Application Data

(60) Provisional application No. 61/792,295, filed on Mar. 15, 2013.

(51) Int. Cl.

| | | |
|---|---|---|
| *G01B 11/16* | (2006.01) | |
| *G01L 1/00* | (2006.01) | |
| *G01B 3/00* | (2006.01) | |
| *G01N 11/00* | (2006.01) | |
| *G01R 25/00* | (2006.01) | |
| *G01P 3/00* | (2006.01) | |
| *G01D 9/00* | (2006.01) | |
| *G01H 1/00* | (2006.01) | |
| *G01L 3/00* | (2006.01) | |
| *G01B 7/14* | (2006.01) | |
| *G01N 27/72* | (2006.01) | |
| *G01R 31/308* | (2006.01) | |

(52) U.S. Cl.
CPC ...................................... *G01B 11/16* (2013.01)

(58) Field of Classification Search
CPC ..... G01B 11/16; G01B 11/081; G01M 15/14; G01L 1/24; G01H 1/006; G01N 21/00; F01D 5/225
USPC ............... 702/41, 33, 42, 43, 91, 56, 79, 106, 702/145, 147, 182; 73/650, 660, 862.324, 73/862.326, 862.328; 324/207.2, 220, 324/754.23
See application file for complete search history.

(56) References Cited

U.S. PATENT DOCUMENTS

| | | | |
|---|---|---|---|
| 6,763,723 B1 | 7/2004 | Zook et al. | |
| 7,224,828 B2 * | 5/2007 | Cotton | G01R 31/311 324/537 |
| 8,925,387 B2 * | 1/2015 | Paul | G01M 11/081 73/760 |
| 2009/0078053 A1 * | 3/2009 | Twerdochlib | G01H 1/006 73/661 |
| 2010/0076703 A1 * | 3/2010 | Twerdochlib | G01H 1/006 702/56 |

* cited by examiner

*Primary Examiner* — Tarifur Chowdhury
*Assistant Examiner* — Sunghee Y Gray
(74) *Attorney, Agent, or Firm* — Cantor Colburn LLP

(57) ABSTRACT

A system and method for performing stress measurement on rotating parts is disclosed. The system may include a laser assembly configured to emit a plurality of laser beams having different wavelengths, and a probe assembly mounted proximal to a rotatable part in a device. The probe assembly may be configured to output a reflected laser beam onto a first target on the rotatable part. The probe assembly may be configured to output another reflected laser beam onto a second target on the rotatable part. The probe assembly may include a redirector, and a lens assembly mounted proximal to the redirector and configured to converge the laser beams. The redirector may be configured to change the direction of each emitted laser beam.

20 Claims, 3 Drawing Sheets

MULTIPLE LASER TIME OF ARRIVAL PROBE

TECHNICAL FIELD OF THE DISCLOSURE

The present disclosure relates to stress measurement of rotating parts and, more particularly, relates to stress measurement used with inspection of rotating members captured by probes.

BACKGROUND OF THE DISCLOSURE

Laser time of arrival probes have been used in industry to measure vibratory deflections of rotating parts to support design validation. The probes are a nonintrusive option that may be used instead of traditional rotating strain gauges. While such probes have been shown to be helpful to the determination of low order/frequency fundamental vibratory modes where expected deflections are relatively large, the use of these probes has been significantly less beneficial to the measurement and determination of high order/frequency modes of vibration typically associated with very low deflection to stress ratios, and therefore very low expected deflections resulting in low signal to noise ratios.

In contrast to measuring low order/frequency modes, successfully measuring high order/frequency modes requires a large number of probes located at different circumferential locations proximal to the rotating part. Such probes should be located in regions where maximum modal deflections occur. If the selected measurement location on the part is not at a local maximum, the measured deflection may be hidden within the noise and the measurement becomes unusable.

High order/frequency modes may also be sensitive to manufacturing variations which cause the location of maximum vibratory deflection to vary from part to part, for example, blade to blade variation within a rotor stage. A blade is an example of a part/subcomponent where a set of such parts/subcomponents when assembled or integrally manufactured as a rotor make up a larger component referred to as a rotor stage. Thus, it may be difficult to select a single repeatable measurement location for all blades within a rotor stage. If the location of the maximum local deflection is not consistent on each blade, it may be very difficult to determine the stress from a measured deflection of the part/subcomponent. To solve these problems a very large and impractical number of probes may be required to increase the probability of measuring the local maximum deflection.

Furthermore, when more than one mode of vibration is being measured often there is a requirement for the probes to be located proximal to multiple locations on the part. In addition, high order/frequency modes may be closely spaced in the frequency domain, and therefore, it may be difficult to correctly identify the mode of vibration, especially when frequency mistuning causes closely spaced modes to simultaneously occur. If the mode is incorrectly identified, the stress to deflection ratios used to estimate stress may not be useful.

SUMMARY OF THE DISCLOSURE

In accordance with one aspect of the present disclosure, a multiple laser time of arrival probe system for stress measurement of rotatable parts is disclosed. The system may comprise a laser emission and detection assembly configured to emit a first laser beam and a second laser beam, and a probe assembly disposed proximal to a rotatable part in an engine. The first and second laser beams may comprise different wavelengths. The probe assembly may be configured to output a first reflected laser beam onto a first target on the rotatable part. The probe assembly may be further configured to output a second reflected laser beam onto a second target on the rotatable part. The second target may be different than the first target. The probe assembly may include a redirector and a lens assembly. The redirector may be configured to change the first laser beam direction from a first direction to a second direction, and configured to change the second laser beam direction from a third direction to a fourth direction. The lens assembly may be mounted proximal to the redirector and configured to converge the first laser beam onto the redirector and to converge the second laser beam onto the redirector.

In a refinement, the laser emission and detection assembly may be further configured to receive and to measure first reflected incident light and second reflected incident light from the rotatable part. Reflection of the first reflected laser beam off of the rotatable part is a primary source of the first reflected incident light and reflection of the second reflected laser beam off of the rotatable part is a primary source of the second reflected incident light.

In one embodiment, the rotatable part may be a blade. In a further refinement, the first target and the second target may be disposed in a target range on the span of the blade. In yet a further refinement, the length of the target range may be less than about 50 percent of the span of the blade and the target range may be substantially disposed in the upper half of the blade. In an alternative refinement, the first target and the second target may be each disposed on the chord of the blade.

In one embodiment, the fourth direction may be different from the second direction.

In another refinement, the third direction may be generally parallel to the first direction.

In an embodiment, the redirector may be a convex mirror. In a refinement, the lens assembly may comprise a first lens disposed between the laser emission and detection assembly and the redirector. The first lens may be configured to converge the first laser beam on a first spot on the convex mirror and to converge the second laser beam on a second spot on the convex mirror. The second spot may be different from the first spot. In yet a further refinement, the first lens may be a GRIN lens. In a different refinement, the multiple laser time of arrival probe system may further comprise first and second return optic channels connected to the laser emission and detection assembly. In such different refinement, the lens assembly may further comprises a second lens disposed between the redirector and the first and second return optic channels. The second lens may be configured to converge first reflected incident light for receipt by the first return optic channel, and to converge second reflected incident light for receipt by the second return optic channel.

In an embodiment, the first and second laser beams may be emitted substantially simultaneously.

In another embodiment, the emitted first laser beam may contact the redirector at a first spot on the redirector and the emitted second laser beam may contact the redirector at a second spot on the redirector. The second spot may be different from the first spot.

In another embodiment, the lens assembly may comprise a first lens configured to converge the first laser beam on a first spot on the redirector and a second lens configured to converge the second laser beam on a second spot on the redirector.

In an embodiment, the redirector may be a convex mirror, a plurality of mirrors or a multi-faceted mirror.

In accordance with another aspect of the present disclosure, a method for performing stress measurement on rotating blades is disclosed. The method may comprise emitting substantially simultaneously a first laser beam and a second laser beam, the first and second laser beams comprising different wavelengths, receiving, by a redirector, the first laser beam and the second laser beam, reflecting the first laser beam onto a first target on the rotatable part and reflecting the second laser beam onto a second target on the rotatable part, capturing the first reflected incident light from the first target and the second reflected incident light from the second target, creating data based on the capturing, and providing the data to a controller configured to determine the vibratory deflection of the rotatable part using the data. The second target may be different than the first target. In a refinement, the redirector may be a convex mirror.

In accordance with another aspect of the present disclosure, a multiple laser time of arrival probe system for stress measurement is disclosed. The system may comprise a laser emission and detection assembly configured to emit substantially simultaneously a first laser beam and a second laser beam, and a probe assembly disposed proximal to a rotating blade in an aircraft engine. The first and second laser beams may comprise different wavelengths. The probe assembly may be configured to output a first reflected laser beam onto a first target on the rotating blade. The probe assembly may further be configured to output a second reflected laser beam onto a second target on the rotating blade. The second target may be different than the first target. The probe assembly may include a redirector and a lens assembly. The redirector may be configured to change the first laser beam direction from a first direction to a second direction, and configured to change the second laser beam direction from a third direction to a fourth direction. The lens assembly may be mounted proximal to the redirector. The lens assembly may be configured to converge the first laser beam onto a first spot on the redirector and the second laser beam onto a second spot on the redirector, the second spot different from the first spot.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION OF THE DISCLOSURE

Figure 1:
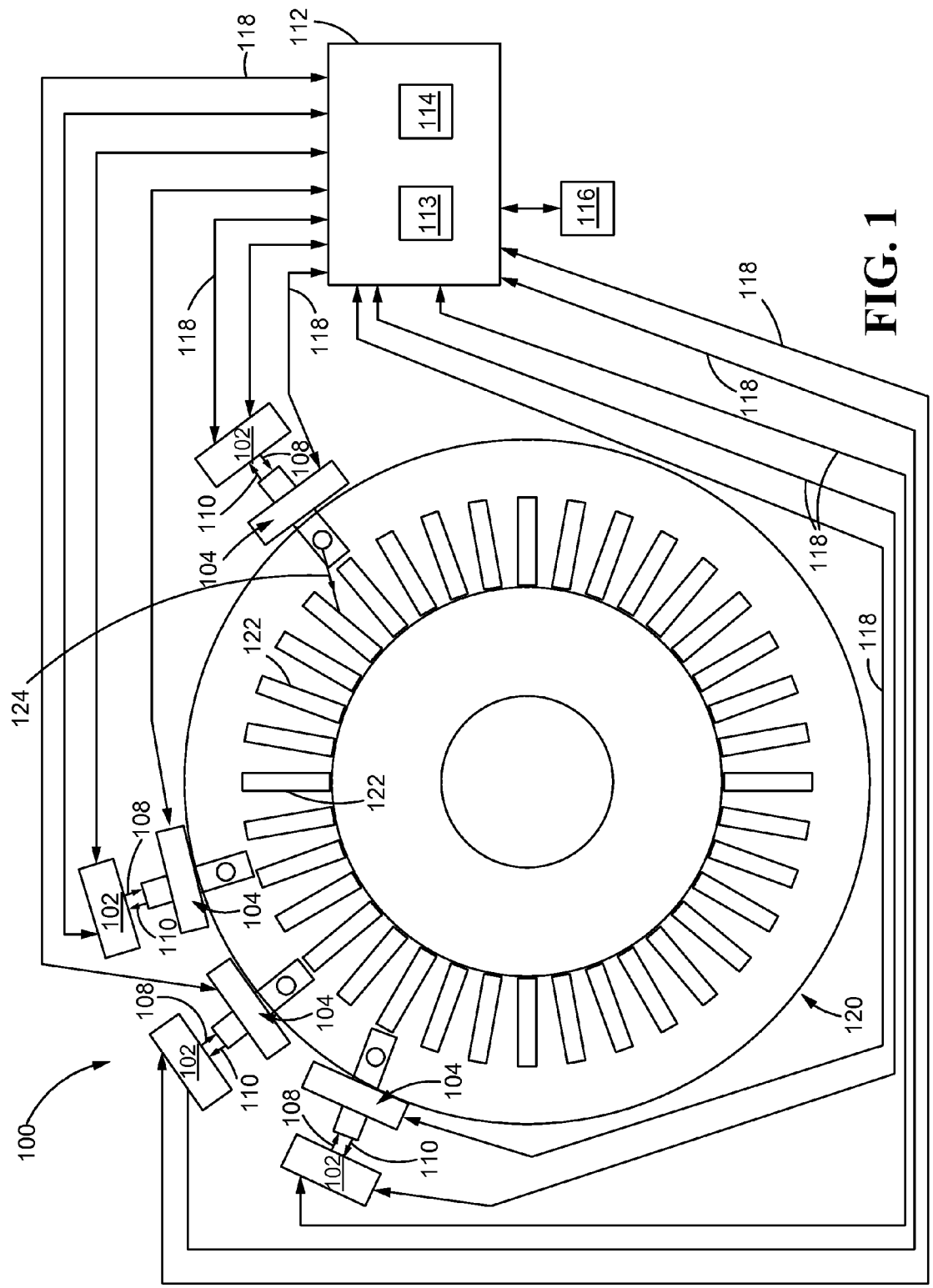
FIG. 1 is a schematic illustration of an embodiment of a stress measurement system.

Referring to FIG. 1, a schematic illustration of one embodiment of a multiple laser time of arrival probe system 100 is shown. In one embodiment, the system may comprise one or more laser emission and detection assemblies 102, one or more time of arrival probe assemblies 104 mounted proximal to rotatable parts 122, a plurality of emission optic channels 108 and a plurality of return optic channels 110. The multiple laser time of arrival probe system 100 may further include a controller 112. In some embodiments, the system may include a user interface 116. The system may further include communication channels 118 that connect each time of arrival probe assembly 104 to the controller 112. Communication channels 118 may also connect the laser emission and detection assembly 102 to the controller 112.

In the exemplary embodiment illustrated in FIG. 1, each time of arrival probe assembly 104 is mounted in an engine 120 proximal to rotatable parts 122 that are blades. The engine 120 may have a plurality of stages, each stage having a plurality of blades, which may require inspection or stress measurement. The engine 120 may be representative of a wide variety of engines, such as, aircraft engines, aeroderivative industrial gas turbines, steam turbines, diesel engines, automotive and truck engines, and the like. Notwithstanding the fact that the present disclosure has been described in relation to inspection and stress measurement of the blades of an engine 120, in other embodiments, the multiple laser time of arrival probe system 100 may be employed to inspect and measure stress on other appropriate rotating parts/subcomponents of other types of equipment and devices. Such rotatable parts 122 are not limited to blades.

The controller 112 (FIG. 1) may include a processor 113 and a memory component 114. The controller 112 may be operatively in communication with the time of arrival probe assembly 104. The controller 112 may also be operatively in communication with the laser emission and detection assembly 102. In some embodiments, the controller 112 may also be operatively in communication with the engine 120. In embodiments that include a user interface 116, the controller 112 may be operatively in communication with the user interface 116 as well. The term "operatively in communication with" includes wireless and wired connections. The processor 113 may be a microprocessor or other processor as known in the art or a processing circuit. The processor 113 may execute instructions and generate control signals for controlling the functionality of the time of arrival probe assembly 104, including determining the measured deflection at target positions 126, 128 on a rotating part 122 and determining the maximum deflection and converting the maximum deflection to measured stress. Such instructions may be read into or incorporated into a computer readable medium, such as the memory component 114 or provided externally to the processor 113 by a source. In alternative embodiments, hard wired circuitry may be used in place of, or in combination with, software instructions to implement a control method.

The term "computer readable medium" as used herein refers to any medium or combination of media that participates in storing and/or providing instructions to the processor 113 for execution. Such a medium may comprise all computer readable media. Common forms of computer-readable media include, for example, a floppy disk, a flexible disk, hard disk, magnetic tape, or any other magnetic medium, a CD-ROM, any other optical medium, or any other medium from which a computer processor 113 can read.

The controller 112 is not limited to one processor 113 and memory component 114. The controller 112 may be several processors 113 and memory components 114.

In embodiment, the controller 112 may transmit control signals to the time of arrival probe assembly 104, and the laser emission and detection assembly 102, and the controller 112 may receive data from such elements of the multiple laser time of arrival probe system 100. This data may be used by the controller 108 to assist with the control of the multiple laser time of arrival probe system 100 and the measurement of stress on the rotating part 122.

The user interface 116 may comprise a visual display. The user interface 116 may also include keyboard, touch screen or any other input device as known in the art. The communication channels 118 may be optical channels or alternatively, may be any other wired, wireless or radio channels or any other type of channels capable of transmitting information between two points including links involving the World Wide Web (www) or the internet.

Figure 2:
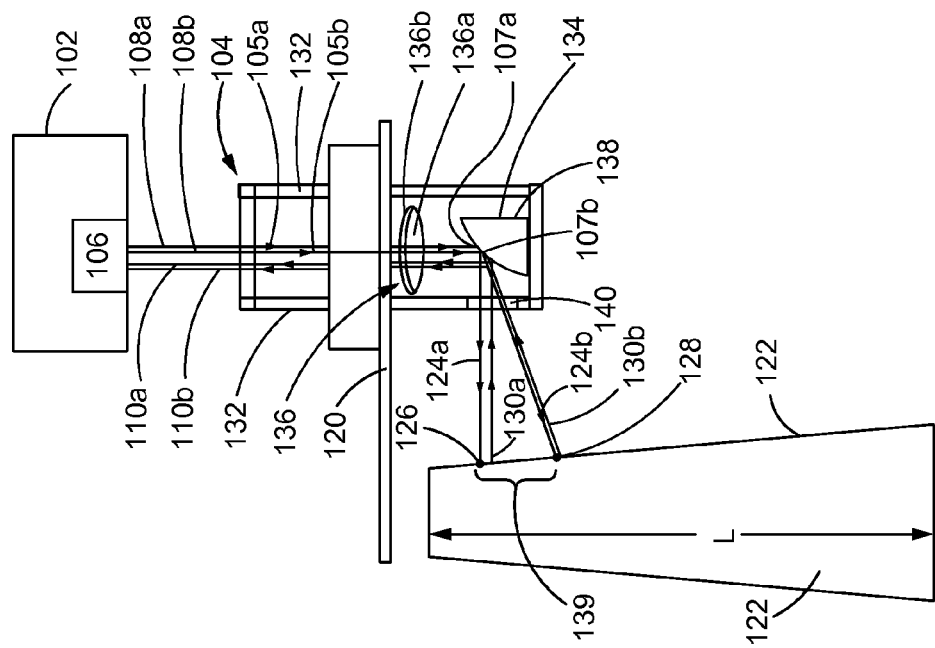
FIG. 2 is a schematic illustration of an embodiment of a probe assembly mounted on a wall of an engine.

FIG. 2 illustrates one embodiment of a laser emission and detection assembly 102 connected to a time of arrival probe assembly 104 mounted on a wall of an engine 120 proximal to rotatable/rotating parts 122. For clarity, one rotable part 122 of the engine 120 is shown in relation to the time of arrival probe assembly 104. It being understood that the rotatable part 122 is one of many rotating/rotatable parts 122 in the engine 120.

Each laser emission and detection assembly 102 is configured to emit a first laser beam 105a and a second laser beam 105b. The emitted first and second laser beams 105a, 105b may have different wavelengths. In one embodiment, the first and second laser beams 105a, 105b may be emitted substantially simultaneously by the laser emission and detection assembly 102. The first and second laser beams 105a, 105b may be emitted in a continuous wave. Alternatively, the first and second laser beams 105a, 105b may be emitted in a pulsed fashion. Each laser emission and detection assembly 102 is paired with a time of arrival probe assembly 104. A pair of emission optic channels 108 extends between the laser emission and detection assembly 102 and the time of arrival probe assembly 104. The first emission optic channel 108a carries or transmits the first laser beam 105a and the second emission optic channel 108b carries or transmits the second laser beam 105b.

Each time of arrival probe assembly 104 may be mounted proximal to the rotatable part 122 and is configured to receive the pair of laser beams 105a, 105b emitted from the laser emission and detection assembly 102. The time of arrival probe assembly 104 is configured to output a first laser beam 105a that has undergone at least one reflection in the time of arrival probe assembly 104 (a "first reflected laser beam" 124a (see FIGS. 2-3)) onto a first target 126 (position) on the rotatable part 122 (in this case, a blade). The time of arrival probe assembly 104 is configured to output a second laser beam 105b that has undergone at least one reflection in the time of arrival probe assembly 104 (a "second reflected laser beam" 124b (see FIGS. 2-3)) onto a second target 128 (position) on the rotatable part 122. In an embodiment, the time of arrival probe assembly 104 may include a casing 132, a redirector 134, and a lens assembly 136 mounted within the casing 132.

The casing 132 (see FIGS. 2-3) of the probe assembly defines a window 140 through which the first and second reflected laser beams 124a, 124b exit the time of arrival probe assembly 104. The casing 132 may enclose all or a portion of the time of arrival probe assembly 104 elements. The window 140 may be an opening. Alternatively, the window may have a transparent covering.

The redirector 134 is configured to change the direction of the first laser beam 105a within the casing 132 from a first direction to a second direction and is configured to change the direction of the second laser beam 105b within the casing 132 from a third direction to a fourth direction. In an embodiment, the second and fourth directions may be different. In some embodiments, the first and third directions may be generally parallel.

The lens assembly 136 is configured to converge the laser beams that are emitted from the laser emission and detection assembly 102 onto the redirector 134. In some embodiments, the lens assembly 136 may also be configured to converge the incident light reflected off of a rotatable/rotating part 122 ("reflected incident light" 130) as it travels through the lens assembly 136 to the detector portion 106 of the laser emission and detection assembly 102. The lens assembly 136 may be a plurality of lenses. For example, in one embodiment, the lens assembly 136 may be comprised of two lenses 136a, 136b. The first lens 136a may converge emitted laser beams 105a, 105b. The second lens 136b may converge reflected incident light 130 off of a rotatable/rotating part 122 as such light travels through the second lens 136b of the lens assembly 136 to the detector portion 106 of the laser emission and detection assembly 102. In another embodiment, the lens assembly 136 may be comprised of four lenses. In such an embodiment, the first lens may be used to converge the first laser beam 105a (emitted from the laser emission and detection assembly 102 at a first wavelength) onto the redirector 134 and a second lens may be used to converge the second laser beam 105b (emitted from the laser emission and detection assembly 102 at a second wavelength) onto the redirector 134. The third lens may be used to converge the first reflected incident light 130a reflected off of a rotatable/rotating part 122 as it travels through the third lens to the detector portion 106 of the laser emission and detection assembly 102. The fourth lens may be used to converge the second reflected incident light 130b reflected off of a rotatable/rotating part 122 as it travels through the fourth lens to the detector portion 106 of the laser emission and detection assembly 102. In one embodiment, the lens assembly may be comprised of a plurality of Gradient-index (GRIN) lenses.

The detector portion 106 of the laser emission and detection assembly 102 may be configured to measure incident light reflected off of a rotatable/rotating part 122. A pair of return optic channels 110 extend between each time of arrival probe assembly 104 and the detector portion 106 of the laser emission and detection assembly 102. The return optic channels 110 carry/transmit from the time of arrival probe assembly 104 the beams of reflected incident light 130 generated from the reflection off of the rotatable/rotating part 122 of a reflected laser beams 124a, 124b. The first return optic channel 110a carries or transmits the reflected incident light resulting from the reflection off of the rotatable/rotating part 122 of the reflected laser beam 124a (the "first reflected incident light" 130a). The second return optic channel 110b carries or transmits the reflected incident light resulting from the reflection off of the rotatable/rotating part 122 of the reflected laser beam 124b (the "first reflected incident light" 130b). Such reflected incident light 130 may enter the time of arrival probe assembly 104 through window 140. The reflected incident light 130a, 130b may journey through the time of arrival probe assembly 104 to the return optic channels 110a, 110b along a generally similar path as that taken by the laser beam entering the time of arrival probe assembly 104 from the laser emission and detection assembly 102 and exiting the window 140 of the time of arrival probe assembly 104 onto the rotatable part 122. The path of the reflected incident light 130a, 130b through the time of arrival probe assembly 104 includes travel through the lens assembly 136. Data related to the reflected incident light 130a, 130b may be transmitted from the laser emission and detection assembly 102 to the controller 112. The optic channels 108, 110 may be any appropriate optic channels known in the art. For example, in one embodiment, the optic channels 108, 110 may be fiber optic channels, or the like. The time of reflection from the rotatable part 122 may occur simultaneously as may the measurement of reflected incident light by the detector portion 106 of the laser emission and detection assembly 102. In some embodiments, the measurement of such reflected incident light 130 may be pulsed.

In this particular embodiment (shown in FIG. 2), both the first target 126 and the second target 128 are disposed on the span of the rotatable part 122. The term "span" referring to the length L of the major dimension of the rotatable part. The first and second targets 126, 128 (positions) may be disposed on the face, the back side, or an edge of the rotatable part 122. Thus, in one embodiment, the first and the second targets 126, 128 may be disposed on the face of the rotatable part at different positions along its span L. Alternatively, the first and second targets 126, 128 may be disposed on the back side of the rotatable part 122 at different positions along its span L. In yet another alternative, the first and second positions may be disposed on a side edge of the rotatable part at different positions along its span L. The side edge may be a leading or trailing edge.

In the embodiment illustrated in FIG. 2, the redirector 134 may be a convex mirror, a multi-faceted mirror, a plurality of mirrors, or the like. The lens assembly 136 may be comprised of a plurality of lenses. For illustration purposes two lenses will be discussed, a first lens 136a and a second lens 136b.

In operation, when the laser emission and detection assembly 102 emits a first laser beam 105a at a first wavelength, the first laser beam 105a travels through the emission optic channel 108a to the time of arrival probe assembly 104. Once in the time of arrival probe assembly 104, the first laser beam 105a travels through the first lens 136a. The first lens 136a, in this embodiment, converges the first laser beam 105a onto the redirector (mirror) 134 at a first spot 107a. The redirector (mirror) 134 reflects the converged laser beam in a first direction and in doing so changes the general travel direction of the emitted first laser beam 105a. This first reflected laser beam 124a then travels out the window 140 of the time of arrival probe assembly 104 and onto the first target 126 on the rotatable part 122 (which in this embodiment is a blade). The first reflected incident light 130a travels back from the first target 126 through the window 140 onto the redirector (mirror) 134. The first reflected incident light 130a is then reflected off of the redirector (mirror) 134 and travels through the second lens 136b before exiting the time of arrival probe assembly 104 through the return optic channel 110a and arriving at the detector portion 106 of the laser emission and detection assembly 102.

Simultaneous to the emission of the first laser beam 105a, the laser emission and detection assembly 102 emits a second laser beam 105b at a second wavelength, the second laser beam 105b travels through the emission optic channel 108b to the time of arrival probe assembly 104. Once in the time of arrival probe assembly 104, the second laser beam 105b travels through the first lens 136a. The first lens 136a converges the second laser beam 105b onto the redirector (mirror) 134 at a second spot 107b. The second spot 107b is different than the first spot 107a. The redirector (mirror) 134 reflects the converged laser beam in a second direction and in doing so changes the general travel direction of the emitted second laser beam 105b. The second direction traveled by this second reflected laser beam 124b may be different from the first direction traveled by the first reflected laser beam 124a. The second reflected laser beam 124b then travels out the window 140 of the time of arrival probe assembly 104 and onto the second target 128 on the rotatable part 122. The second target 128 is different from the first target 126 on the blade 122. The second reflected incident light 130b travels back from the second target 128 through the window 140 onto the redirector (mirror) 134. The second reflected incident light 130b is then reflected off of the redirector (mirror) 134 and travels through the second lens 136b before exiting the time of arrival probe assembly 104 through the return optic channel 110b and arriving at the detector portion 106 of the laser emission and detection assembly 102.

Each target 126, 128 on the blade 122 is disposed within a target range 139. The target range 139 may vary. In one embodiment, the length of the target range 139 may extend a distance that is about twenty-five percent of the total length of the blade 122. In another embodiment, each target 128, 130 may be disposed within a target range 139 that extends a distance that is equivalent to about ten percent of the length of the blade 122. In yet another embodiment, each target 126, 128 may be disposed within a target range 139 that has a length of about thirty-five percent of the span of the blade 122. The disclosure is not limited to these exemplary target ranges 139 along the span length. Other target ranges 139 are contemplated as well.

Figure 3:
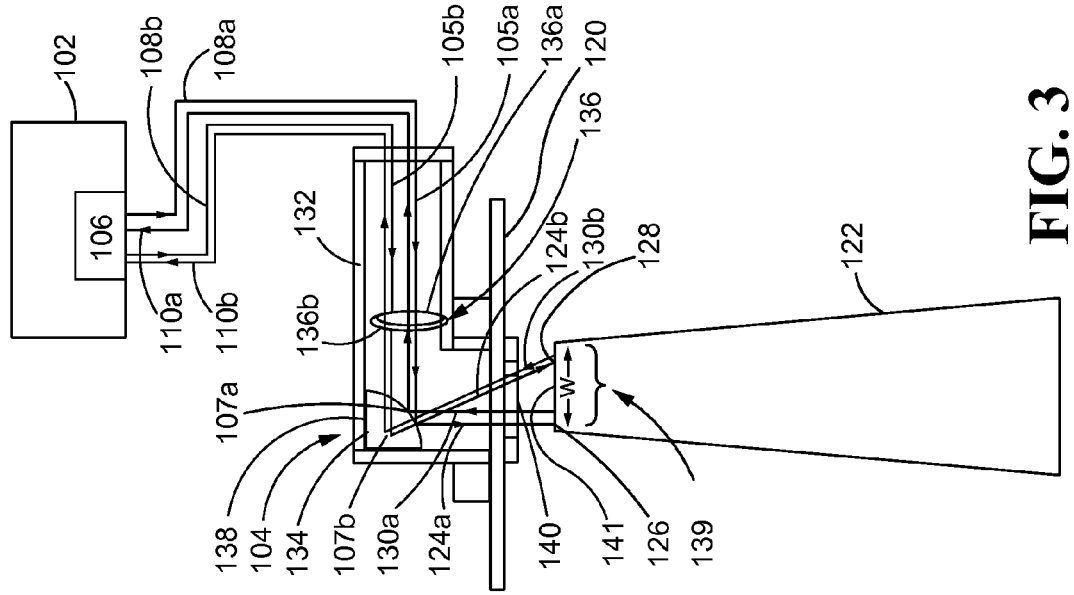
FIG. 3 is a schematic illustration of another embodiment of a probe assembly mounted on a wall of an engine.

Similar to FIG. 2, FIG. 3 illustrates yet another embodiment of the time of arrival probe assembly 104 of the multiple laser time of arrival probe system 100 and an exemplary blade 122. The laser emission and detection assembly 102 is configured to emit a first laser beam 105a and a second laser beam 105b, and to measure the first reflected incident light 130a reflected from a first target 126 on the chord of the rotatable part 122 (blade) 122 and to measure the second reflected incident light 130b reflected from a second target 128 on the chord of the rotatable part (blade) 122. The term "chord" referring to the width W of the tip 141 of the blade 122.

Similar to the embodiment illustrated in FIG. 2, the probe assembly includes a casing 132, a redirector 134, and a lens assembly 136. In this embodiment, the redirector 134 may be a convex mirror, a multi-faceted mirror, a plurality of mirrors, or the like, and the lens assembly may be comprised of two lenses, a first lens 136a and a second lens 136b. For illustration purposes, a convex mirror is shown in FIG. 3.

The functionality of the embodiment illustrated in FIG. 3 is the same as that discussed for the embodiment in FIG. 2, except that the first and second targets 126, 128 on the blade 122 are disposed along the chord W of the blade 122 instead of the span L of the blade 122.

In one embodiment, each target 126, 128 on the blade 122 may be disposed within a target range 139 that may extend a distance that is about twenty-five percent of the chord (width) of the blade 122. (The chord or width W of the blade may also commonly be referred to as the axial length.) In another embodiment, each target 126, 128 may be disposed within a target range 139 that may extend a distance that is about ten percent of the chord (width) of the blade 122. In yet another embodiment, each target 126, 128 may be disposed within a target range 139 that may extend a distance that is equivalent to about thirty-five percent of the chord (width) of the blade 122. The disclosure is not limited to these exemplary target ranges along the chord. Other target ranges are contemplated as well.

Figure 4:
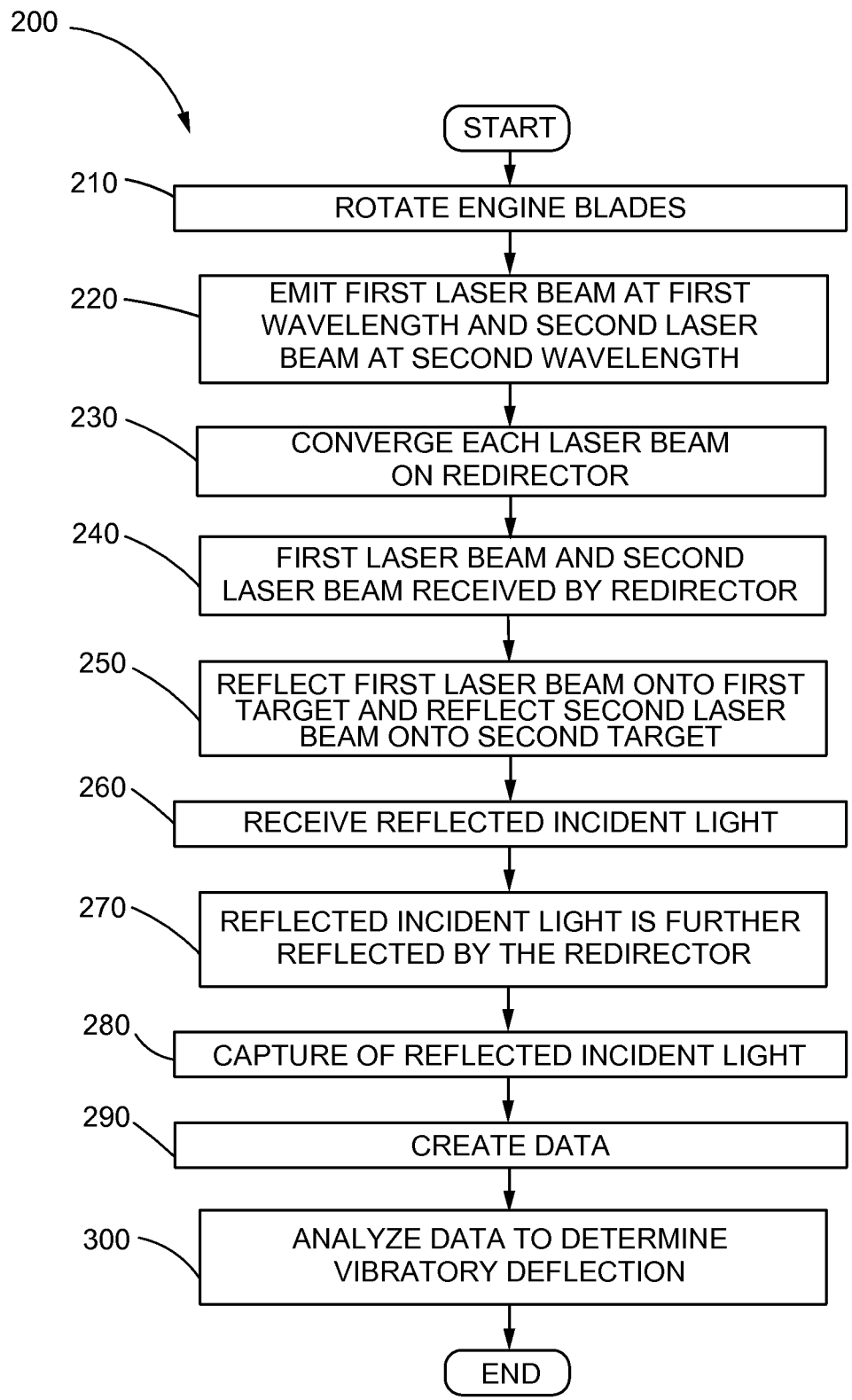
FIG. 4 is a flowchart illustrating a process flow which may be followed in performing inspection and stress measuring using the system of FIG. 1, in accordance with an embodiment.

Also disclosed is a method that may be used to perform automated inspection and stress measuring using the multiple laser time of arrival probe system 100. FIG. 4 is a process flow 200 describing a process which may be followed in performing automated inspection and stress measuring using the multiple laser time of arrival probe system 100. For purposes of clarity, rotating parts 122 will be blades on an engine 120 and the probe 104 is inserted in the engine 120.

In block 210, the rotatable parts 122 in the engine are rotated. Rotation of the rotatable parts 122 causes the rotatable parts 122 to experience some level of vibration. This vibrational movement tends to be in the forward and rearward directions in relation to the rotatable part 122 (i.e., normal to the surface) and may be referred to as deflection of the rotatable part 122. There will be a variation from the expected time of arrival of the rotatable part 122 (at the time of arrival probe assembly 104 location) due to this deflection. The multiple laser time of arrival probe system 100 may be utilized to determine the amount of deflection (at the target 126, 128 point on the rotatable part (blade) 122) by using the difference between the expected time of arrival of the target point on the rotatable part (blade) 122 and the actual time of arrival of the target point on the rotatable part (blade) 122 at a time of arrival probe assembly 104 location.

In block 220, a first laser beam 105a and a second laser beam 105b are generated and emitted substantially simultaneously from the laser emission and detection assembly 102. The first and second emitted laser beams 105a, 105b each have different wavelengths.

In block 230, the first laser beam 105a passes through a lens assembly 136 which converges the first laser beam 105a on the redirector 134 at a first spot 107a. Substantially simultaneously, the second laser beam 105b passes through the lens assembly 136 which converges the second laser beam 105b on the redirector 134 at a second spot 107b.

In block 240, the first laser beam 105a and the second laser beam 105b are received by the redirector 134.

In block 250, the first laser beam 105a is reflected off the redirector 134 onto a first target 126 on the rotatable part 122 and the second laser beam 105b is reflected by the redirector 134 onto a second target 128 on the rotatable part 122. The second target 128 is different than the first target 126.

In block 260, the first reflected incident light 130a from the first target 126 is received by the redirector 134 and the second reflected incident light 130b from the second target 128 is received by the redirector 134.

In bock 270, the first reflected incident light 130a is reflected by the redirector 134 to the second lens 136b and the second reflected incident light 130b is reflected by the redirector 134 to the second lens 136b. The second lens 136b is configured to converge the first reflected incident light 130a into the return optic channel 110a, and to converge the second reflected incident light 130b into the return optic channel 110b. The lens 136b filters out light collected from unintended sources.

In block 280, the first reflected incident light 130a from the first target 126 is captured and the second reflected incident light 130b from the second target 128 is captured by the detector portion 106 of the laser emission and detection assembly 102. The captured light intensity may also be measured by the laser emission and detection assembly 102.

In block 290, data is created based on the capturing step in block 270.

In block 300, the data is provided to a controller 112 that analyzes and determines the vibratory deflection of the rotatable part 122 using the data. To determine the actual time of arrival of blade 122, the intensity of the reflected incident light 130 off of the rotating part 122 is measured. In one embodiment, the reflected incident light 130 intensity may be measured (by the detector portion 106 of laser emission and detection assembly 102) off of the trailing edge of the rotating part (blade) 122. The reflected incident light 130 increases as the trailing edge of the rotating part (blade) 122 approaches the time of arrival probe assembly 104 (and the source of the reflected laser beam 124 that is incident on the trailing edge of the blade). As the trailing edge leaves the laser beam 124 there is a relatively sharp decrease in the amount of light returned. This relatively sharp drop-off may be utilized to determine the time of arrival.

Once the difference between the expected time of arrival of the rotating part (blade) 122 and the actual time of arrival at a probe assembly 104 position is determined by the controller 112, the amount of measured deflection may be determined by the controller 112 using various methods. Such methods may include but are not limited to constant velocity, constant acceleration, or spline fit approximations, or the like. The maximum "measured" deflection may be converted by the controller 212 to measured stress. To convert the maximum measured deflection to measured stress, a ratio of predicted stress to deflection may be used. Such a ratio is based upon a normalized model that predicts stress as a function of deflection in blade contour.

In some embodiments, the targets and the associated measurements may be for points that are only in a portion of the total span. For example, in one embodiment, the targets may be disposed in the portion of the span that is between about 50% and about 100% of the span of the rotatable part 122 (the upper half of the blade). In some embodiments, the targets may be disposed in a portion of the span that is between about 75% and 100% of the span (the upper quarter of the blade). Alternatively, the measured deflection may be plotted versus the location in the chord of the rotatable part 122 (blade) in which the target was disposed.

INDUSTRIAL APPLICABILITY

In general, the present disclosure sets forth a system and method for performing stress measurement on rotating parts. The system may include a laser assembly configured to simultaneously emit a first laser beam at a first wavelength and a second laser beam at a second wavelength, and a probe assembly mounted proximal to a rotatable part in an engine. The probe assembly may be configured to output a first reflected laser beam onto a first target on the rotatable part. The probe assembly may further be configured to output a second reflected laser beam onto a second target on the rotatable part. The probe assembly may include a casing, a redirector, and a lens assembly mounted within the casing and configured to converge the laser beam.

The method may include emitting substantially simultaneously a first laser beam and a second laser beam, the first and second laser beams having different wavelengths. The method may further include receiving, by a redirector, the first laser beam and the second laser beam, and reflecting the first laser beam onto a first target on the rotatable part and reflecting the second laser beam onto a second target on the rotatable part. The second target is different than the first target. The method further includes capturing the first reflected incident light from the first target and the second reflected incident light from the second target, creating data based on the capturing step and providing the data to a controller that determines the vibratory deflection of the rotatable part using the data.

The present disclosure provides for the measuring of stress experienced by rotating parts in a way that significantly increases the probability of measuring the local maximum vibratory deflection of a rotating part thereby enabling the measurement of vibratory modes with very small deflection. The ability to measure a multiple locations simultaneously with a single probe assembly significantly improves the efficiency and confidence of the measurement process.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A multiple laser time of arrival probe system for stress measurement of rotatable parts, the system comprising:
   a laser emission and detection assembly configured to emit a first laser beam and a second laser beam, the first and second laser beams comprising different wavelengths; and
   a probe assembly disposed proximal to a rotatable part in an engine, the probe assembly configured to output a first reflected laser beam onto a first target on the rotatable part, the probe assembly further configured to output a second reflected laser beam onto a second target on the rotatable part, the second target different than the first target, the probe assembly including:
      a redirector configured to change the first laser beam direction from a first direction to a second direction, and configured to change the second laser beam direction from a third direction to a fourth direction; and
      a lens assembly mounted proximal to the redirector and configured to converge the first laser beam onto the redirector and to converge the second laser beam onto the redirector.

2. The multiple laser time of arrival probe system of claim 1, in which the laser emission and detection assembly is further configured to receive and to measure first reflected incident light and second reflected incident light from the rotatable part, wherein reflection of the first reflected laser beam off of the rotatable part is a primary source of the first reflected incident light and reflection of the second reflected laser beam off of the rotatable part is a primary source of the second reflected incident light.

3. The multiple laser time of arrival probe system of claim 1, wherein the rotatable part is a blade.

4. The multiple laser time of arrival probe system of claim 3, wherein the first target and the second target are disposed in a target range on the span of the blade.

5. The multiple laser time of arrival probe system of claim 4, wherein the length of the target range is less than about 50 percent of the span of the blade and the target range is substantially disposed in the upper half of the blade.

6. The multiple laser time of arrival probe system of claim 3, wherein the first target and the second target are each disposed on the chord of the blade.

7. The multiple laser time of arrival probe system of claim 1, wherein the fourth direction is different from the second direction.

8. The multiple laser time of arrival probe system of claim 7, wherein the third direction is generally parallel to the first direction.

9. The multiple laser time of arrival probe system of claim 1, wherein the redirector is a convex mirror.

10. The multiple laser time of arrival probe system of claim 9, wherein the lens assembly comprises a first lens disposed between the laser emission and detection assembly and the redirector and configured to converge the first laser beam on a first spot on the convex mirror and to converge the second laser beam on a second spot on the convex mirror, the second spot different from the first spot.

11. The multiple laser time of arrival probe system of claim 10, wherein the first lens is a GRIN lens.

12. The multiple laser time of arrival probe system of claim 10, further comprising:
   first and second return optic channels connected to the laser emission and detection assembly; and
   wherein the lens assembly further comprises a second lens disposed between the redirector and the first and second return optic channels, the second lens configured to converge first reflected incident light for receipt by the first return optic channel, and to converge second reflected incident light for receipt by the second return optic channel.

13. The multiple laser time of arrival probe system of claim 1, wherein the first and second laser beams are emitted substantially simultaneously.

14. The multiple laser time of arrival probe system of claim 1, wherein the emitted first laser beam contacts the redirector at a first spot on the redirector and the emitted second laser beam contacts the redirector at a second spot on the redirector, the second spot different from the first spot.

15. The multiple laser time of arrival probe system of claim 1, in which the lens assembly comprises a first lens configured to converge the first laser beam on a first spot on the redirector and a second lens configured to converge the second laser beam on a second spot on the redirector.

16. The multiple laser time of arrival probe system of claim 1, wherein the redirector is a plurality of mirrors.

17. The multiple laser time of arrival probe system of claim 1, wherein the redirector is a multi-faceted mirror.

18. A method of performing stress measurement on rotating blades, the method comprising:
   emitting substantially simultaneously a first laser beam and a second laser beam, the first and second laser beams comprising different wavelengths;
   receiving, by a redirector, the first laser beam and the second laser beam;
   reflecting the first laser beam onto a first target on the rotatable part and reflecting the second laser beam onto a second target on the rotatable part, the second target different than the first target;
   capturing the first reflected incident light from the first target and the second reflected incident light from the second target;
   creating data based on the capturing; and
   providing the data to a controller configured to determine the vibratory deflection of the rotatable part using the data.

19. The method of claim 18, wherein the redirector is a convex mirror.

20. A multiple laser time of arrival probe system for stress measurement, the system comprising:
   a laser emission and detection assembly configured to emit substantially simultaneously a first laser beam and a second laser beam, the first and second laser beams comprising different wavelengths; and
   a probe assembly disposed proximal to a rotating blade in an aircraft engine, the probe assembly configured to output a first reflected laser beam onto a first target on the rotating blade, the probe assembly further configured to output a second reflected laser beam onto a second target on the rotating blade, the second target different than the first target, the probe assembly including:
      a redirector configured to change the first laser beam direction from a first direction to a second direction, and configured to change the second laser beam direction from a third direction to a fourth direction; and
      a lens assembly mounted proximal to the redirector and configured to converge the first laser beam onto a first spot on the redirector and the second laser beam onto a second spot on the redirector, the second spot different from the first spot.

* * * * *